May 18, 1954  F. PERLIN  2,678,582
LIGHT METER
Original Filed Aug. 25, 1947
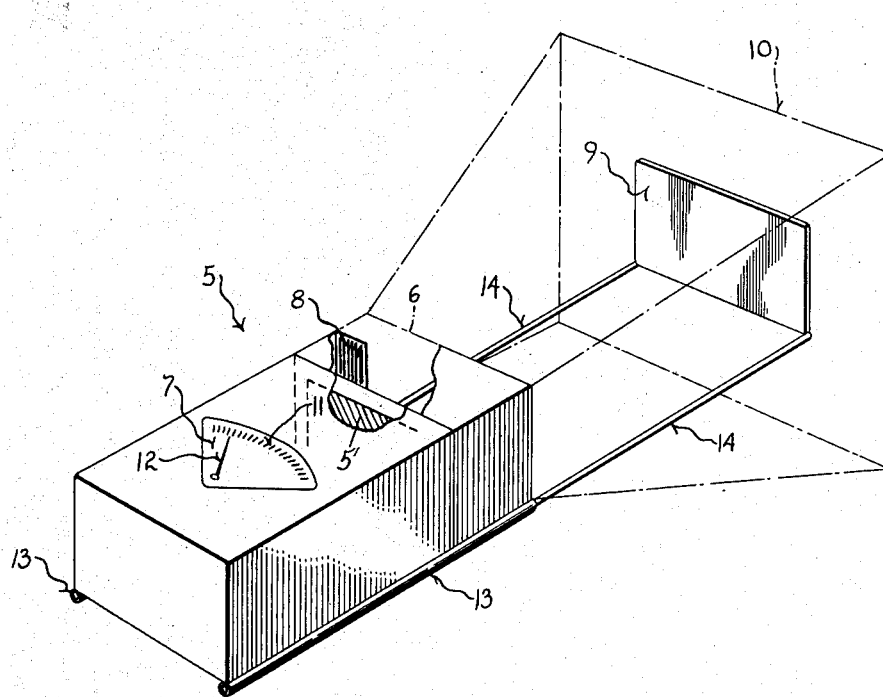

Patented May 18, 1954

2,678,582

UNITED STATES PATENT OFFICE 2,678,582

LIGHT METER

Fred Perlin, Edgerton, Wis.

Original application August 25, 1947, Serial No. 770,427, now Patent No. 2,509,366, dated May 30, 1950. Divided and this application October 12, 1949, Serial No. 120,855

4 Claims. (Cl. 88—23)

This invention relates to substantially the same subject matter as the copending application of Fred Perlin, Serial No. 770,427, filed August 25, 1947, for Light Meter, now Patent No. 2,509,366, issued May 30, 1950, of which this is a division.

Thus, this invention relates to improved apparatus for use in regulating photographic lighting and exposure so that the photographic reproduction of objects in a scene will have brightness variations correctly related to one another so as to correspond to the brightness variations of the object or plurality of objects in the scene photographed.

The H-D (Hurter-Driffeld) curve referred to herein, as is well known in the art, is a graph of density as a function of exposure, where the ordinates correspond to density and are on a linear scale, and the abscissas correspond to exposure and are on a logarithmic scale. The H-D curve is positively curved in the region of small exposures and densities, is negatively curved in the region of large exposures and densities and is virtually linear therebetween. Further information may be obtained in any textbook on photography and sensitometry.

Because the H-D curve of both the emulsions used in color (chromatic) and black-and-white (achromatic) film have this characteristic shape, it follows that in both color photography and black-and-white photography an imperfect reproduction results where the brightness variations of the scene photographed are of such range as to be broader than the linear portion of the H-D curve of the negative and positive emulsions used in making the photographic reproduction. This results in a serious loss of tone value in the reproduction.

For example, in ordinary achromatic photography, in a scene including a grey tone, as viewed by the eyes, the grey tone will often appear as a black in the photographic reproduction with virtually complete loss of tone value and with an improper relationship to the rest of the various densities of the photographic reproduction.

One type of prior art exposure meter comprised a photo-sensitive cell of the boundary-layer type, adapted to be placed a short distance in front of and facing various portions of a scene to be photographed, connected with an electrically responsive meter. Light from both the brightest portions of the scene and the darkest portions of the scene might be separately and individually measured by such an exposure meter; then the exposure of the whole scene might be determined so that the brightest or darkest portions would fall at any selected point on the H-D curve.

However, generally speaking, the brightness range was of such breadth as to exceed the linear portion of the H-D curve and either the brightest portion or the darkest portion, or both, would have to be placed on non-linear curved portions of the H-D curve, thus resulting in an imperfect photographic representation of the scene photographed.

This is a very great disadvantage in achromatic photography and is a fatal defect in color photography since, as is well known in the art, the emulsions used in color photography are much more critical than those used in achromatic photography.

As a result of this characteristic of color film it is generally necessary, in color photography, to use "flat" lighting, that is, lighting directed on the objects to be photographed from a point closely adjacent to the camera so that the light rays are virtually parallel to the camera and illuminate the object or plurality of objects to be photographed in a manner casting virtually no shadows. This is because any very considerable variation in density of the photographic reproduction would cause a serious color error.

In certain cases where a plurality of objects has very different brightness values, even such flat lighting is not satisfactory, since the allowable range of photographic density variations is exceeded, thus resulting in considerable color error.

It will readily be understood that the median densities of a whole series of photographic reproductions will all be properly related one to the other if the incident light illuminating each scene is exactly the same. For this purpose a photographic exposure meter of the type hereinbefore mentioned may be placed in front of each object in a scene to be measured and directed toward the illuminating incident light for determining the general light intensity on the scene but not the light reflected from the scene. However, this does not provide for proper tone value relationship at either the upper or lower portions of the H-D curve.

The invention of the aforesaid copending application, generally speaking, comprises apparatus for making photographic reproductions more faithfully reproducing the brightness variations of a scene to be photographed by effectively combining and measuring both incident light illuminating objects in the scene and reflected light from objects in the scene, in selected proportions, to enable varying the incident light on the various objects in the scene until the combined measured light equals a selected value, whereby to effectively compress the brightness range of the photographic reproduction to the linear portion of its H-D curve.

The present invention has as its principal object the provision of an apparatus for the same purpose, but which is considerably simpler and less expensive than that of the aforesaid copending application.

Another object of this invention resides in the provision of apparatus which will enable the making of photographic representations faithfully reproducing the brightness variations of the various objects in a scene to be photographed by effectively compressing the brightness range of the photographic representation to the linear portion of its H-D curve, and which apparatus may be readily constructed around a conventional light meter.

Still another object of this invention resides in the provision of a device of the character described in the aforesaid copending application but which does not involve mirrored reflecting surfaces.

With the above and other objects in view which will appear as the description proceeds, this invention resides in the novel construction, combination and arrangement of parts substantially as hereinafter described, and more particularly defined by the appended claims it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which the single figure is a perspective view of the device of this invention.

Referring now to the accompanying drawing, the numeral 5 designates generally a standard photo-electric exposure meter of the type having a photo-sensitive surface 5' providing the front of its housing, and a meter 7 with the housing and connected with the photo-sensitive surface in the usual manner so as to provide a measurement of the intensity of light falling upon said surface. The photo-sensitive surface may comprise a cell of the boundary-layer type, capable of generating voltages when light impinges the boundary-layer (such as, for example, a cuprous oxide or selenium cell), and the meter 7 may likewise be of the usual type, comprising a microammeter or millivoltmeter having a suitably calibrated dial 11 and needle or indicator 12.

Surrounding the photo-sensitive surface is a view-angle restricting means which, in the present instance, comprises a four-sided shield 8 but which may take the form of a narrow angle lens, a plurality of parallel plates, a grillage or other type of means for limiting the view-angle of the surface.

A card 9 is supported at a distance from the photo-sensitive surface and within its field of view, the area of the card being a selected amount smaller than the view area encompassed by the photo-sensitive cell, as indicated by the dashed lines 10 which represent the view-angle to which the cell is restricted by virtue of the shield 8.

The card 9 has a white or light-grey surface facing the photo-sensitive cell and substantially parallel thereto and coaxial therewith so as to reflect onto the latter a predetermined portion of the incident light falling upon the scene, and the card is adjustably supported at a predetermined distance from the cell by means of an extensible support which may comprise telescoping tubes 13 and rods 14.

In using the meter of this invention it is placed closely adjacent to an object to be photographed, with the standard white card 9 placed in contact with, or immediately in front of, the object. The incident light illuminating the object also illuminates the standard white card, and a predetermined portion of the incident light is thus reflected into the exposure meter together with a predetermined portion of the light reflected from the object, as defined by the area outside the edges of the card and within the dash line 10.

Since the standard white card 9 is of a certain selected size in comparison with the field of view of the photo-sensitive surface, the light reflected from said card corresponds to the incident light and is in a proportion or ratio to the light reflected from the object corresponding to their respective areas "viewed" by the photo-sensitive surface. It should be noted that light reflected from the standard card 9 will be considered and referred to hereinafter as incident light, and light reflected from the object will, as hereinbefore indicated, be referred to as reflected light.

The combined reflected and incident light received by the photo-sensitive surface is, of course, translated into corresponding electrical variations which, in turn, are translated by the electrically responsive means into corresponding positions of the indicator 12 with respect to the dial face 11.

The meter will of course be calibrated to correspond with the emulsion being used so that a certain selected reading of the indicator 12 with respect to the indicia on the dial face 11 will place the brightness range of the objects to be photographed on the desired linear portion of the H-D curve. In actual practice the position and whiteness of the card 9 are so related to the field of view defined by the shield 8 that the value of light falling upon the photo-sensitive surface from the area around the card is 2.5 to 3.5 times the value of the same light as reflected by the card.

Now if the reading observed from an object in a scene to be photographed is other than the selected reading, the lighting on that object may be varied until a reading within a desired range is observed. If this is done for various objects in the scene, when the photographic reproduction is made, all the objects will be in their correct tonal relationships, since the whole brightness range lies on the linear portion of the H-D curve. This applies to principal objects in the scene to be photographed. Shadows may cause a lesser reading to be observed on the meter, say for example, half of the selected reading for the rest of the scene. This effectively results in expanding the brightness range for said shadows, thus achieving the desired contrast. This last lighting arrangement is purely optional and may be employed where such effects are desired.

From the foregoing description, taken together with the accompanying drawing, it will be readily apparent to those skilled in the art that this invention provides a simple and inexpensive light meter which will readily enable a photographer to so adjust lighting upon the objects in a scene to be photographed as to compress their brightness range to the linear portion of the H-D curve of the emulsion being used, so that the photographic representation of the scene will show all of the objects therein in their true tonal values.

What I claim as my invention is:

1. In a light meter for use in photography, including a housing open at its front, a single photo-electric cell in the housing extending across the open front thereof, and means for visually indicating the response of the cell, the combination of: a light reflector having a light reflecting surface of predetermined area and reflectivity; reflector supporting means on the housing projecting forwardly therefrom and having the reflector secured thereto a distance in front of the housing sufficient to preclude the housing casting a shadow upon the reflecting surface from light falling obliquely thereon, but in the field of view of the photo-sensitive cell and with its reflecting surface facing the cell, said position of the reflector enabling incident light from all directions in front of the reflector to strike its reflecting surface and be reflected onto the photo-sensitive cell; and shield means on the front of the housing ahead of the photo-sensitive cell limiting the field of view thereof to an area, which, in the plane of the reflector, is greater than the area of the reflector, so that common portions of the cell are sensitive to light reflected from the surface of an object to be photographed and adjacent to which the reflector is placed as well as to the incident light reflected from the reflecting surface of the reflector.

2. In a light meter, the combination of claim 1 further characterized by the fact that: the position of the reflector with respect to the photo-sensitive cell, and its light reflectivity, are so related to the field of view defined by the shield means that the value of the light impressed upon the photo-sensitive cell by reflection from the surface of an object to be photographed and adjacent to which the reflector is placed is 2.5 to 3.5 times the value of the incident light impressed upon the cell by reflection from the reflecting surface.

3. In a light meter, the combination of claim 1, further characterized by the fact: that the reflecting surface is flat; that the reflector is of a size substantially coextensive with the open front end of the housing; and that the supporting means for the reflector is adjustable to enable adjustment of the reflector toward and from the open front end of the housing.

4. In a light meter, the combination of claim 1 further characterized by the fact that: the position of the reflector with respect to the photo-sensitive cell, and its light reflectivity, are so related to the field of view defined by the shield means that the value of the light impressed upon the photosensitive cell by reflection from the surface of an object to be photographed and adjacent to which the reflector is placed is 2.5 to 3.5 times the value of the incident light impressed upon the cell by reflection from the reflecting surface.

References Cited in the file of this patent

UNITED STATES PATENTS

| Number | Name | Date |
|---|---|---|
| 454,719 | Dreshler | June 23, 1891 |
| 702,329 | Poliakoff | June 10, 1902 |
| 2,095,312 | Cahn | Oct. 12, 1937 |
| 2,203,036 | Van Briessen et al. | June 4, 1940 |
| 2,503,768 | Riszdorfer | Apr. 11, 1950 |

OTHER REFERENCES

"The Neutrowe Gray Exposure Aid," by Cobb and D. Lowe, Photo Technique, September 1940, pages 19 through 23.

Ser. No. 357,992, Riszdorfer (A. P. C.), published May 4, 1943.